(No Model.)
V. RATCLIFF.
WEIGHING APPARATUS.
No. 563,802. Patented July 14, 1896.
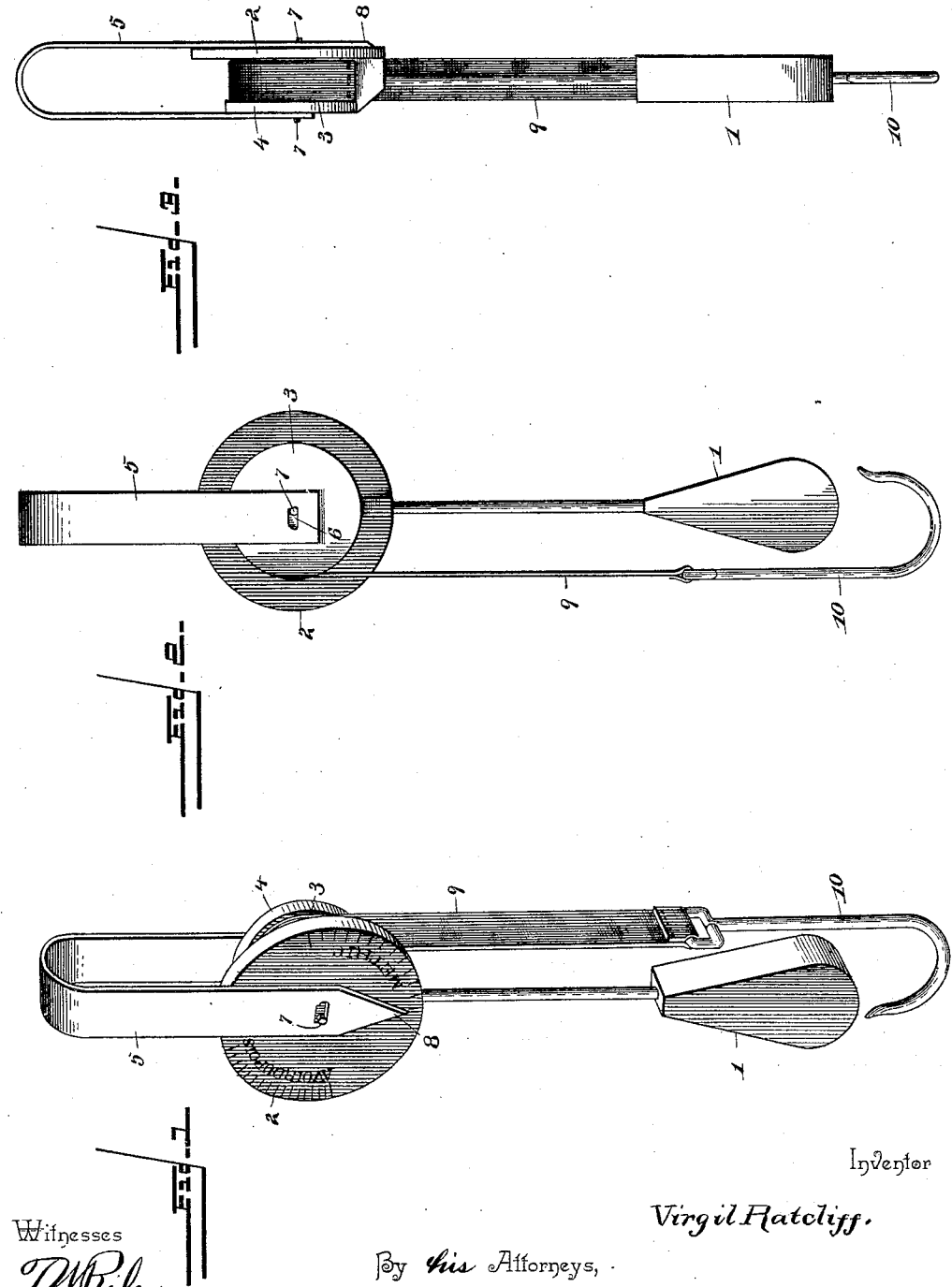
Witnesses
D. W. Riley
R. M. Smith
Inventor
Virgil Ratcliff.
By his Attorneys,
C. A. Snow & Co.

UNITED STATES PATENT OFFICE.

VIRGIL RATCLIFF, OF RUSSIAVILLE, INDIANA.

WEIGHING APPARATUS.

SPECIFICATION forming part of Letters Patent No. 563,802, dated July 14, 1896.

Application filed September 6, 1895. Serial No. 561,656. (No model.)

*To all whom it may concern:*

Be it known that I, VIRGIL RATCLIFF, a citizen of the United States, residing at Russiaville, in the county of Howard and State of Indiana, have invented a new and useful Weighing Apparatus, of which the following is a specification.

This invention relates to an improvement in weighing-scales, and has for its object to provide a simple and inexpensive apparatus of the character referred to which shall be cheap and durable in construction, not liable to get out of order or become quickly worn out and worthless, and which shall be compact and portable.

To the above end the invention consists in an improved weighing-scale embodying certain novel features and details of construction and arrangement of parts, as hereinafter fully described, illustrated in the drawings, and finally pointed out in the claim.

In the accompanying drawings, Figure 1 is a perspective view of the improved weighing-scale constructed in accordance with this invention. Fig. 2 is a rear elevation of the same. Fig. 3 is a side elevation thereof.

Similar numerals of reference designate corresponding parts in the several figures of the drawings.

Referring to the accompanying drawings, 1 designates a weight or pendulum having fixedly attached to its upper end a graduated dial 2, the axis of which is disposed in a plane at right angles to the stem of the pendulum. This dial is provided upon its rear face with a concentric extension 3, the same constituting a hub or pulley, the rear end of which is expanded in diameter to form a peripheral flange 4, the purpose of which will appear.

5 designates a U-shaped hanger, which is preferably formed from a strip of thin sheet metal bent into loop form, as shown, the extremities of said hanger being disposed in proximal planes and formed with transversely-extending horizontal slots 6, which are adapted to receive the projecting ends of a spindle 7, passing concentrically through the graduated dial and its hub extension. By elongating the slots 6 horizontally, the spindle 7 may roll therein and thus avoid and do away with the friction which would result from the turning of said spindle within a simple perforation or circular bearing. The forward arm or portion of the hanger 5 is extended downwardly in proximity to the peripheral edge of the dial and pointed, as shown, to constitute an indicating-finger 8, which will coöperate with the graduations on said dial to indicate the weight of an article.

9 represents a flexible tape or ribbon of steel or leather, or any material combining the necessary degrees of tensile strength and flexibility. This tape or ribbon is secured at one end to and extended partially around the hub or pulley portion 3 of the dial, and has secured to its opposite pendent end a hook 10 or any other form of device for the reception of the material to be weighed.

From the foregoing description it will be understood that when an article is placed upon the hook 10, or supported from the tape or ribbon 9, the leverage exerted and represented by the radius of the hub or pulley portion 3 of the dial will operate to vibrate the weight or pendulum 1, and thereby partially revolve the dial 2, whereupon the weight of the article may be ascertained by observing the graduation on the dial opposite to the indicating-finger 8.

It will be apparent that the principles above described may be used in other forms of scales, such as platform or stock scales of any size. Likewise one or more systems of weights, such as avoirdupois or the metric system, may be represented by the scale or graduations upon the dial.

The apparatus above described may be made from any preferred or desired material, and will be found to possess the same advantages as spring-scales, in that they are self-indicating and do not require the adjustment of a weight for each article weighed, as in steel-yard, balance, and beam scales.

Changes in the form, proportion, and minor details of construction may be resorted to without departing from the spirit or sacrificing any of the advantages of this invention.

Having thus described the invention, what is claimed as new, and desired to be secured by Letters Patent, is—

The herein-described weighing-scale, comprising a graduated dial, a vibrating weight or pendulum having a rigid connection with said dial and arranged at right angles to the spindle of the dial, a hub or pulley fast on and rotatable with said dial, an inverted-U-shaped hanger embracing said dial and its hub or pulley and provided with alined transverse horizontal slots in which the ends of the dial-spindle are received and adapted to roll, one of the terminals of said hanger being extended downward to the lower perimeter of the dial and pointed to form an indicator-finger, and a flexible tape or ribbon secured to and wound partially around the periphery of the aforesaid hub or pulley and provided at its pendent end with a depending receptacle for the article to be weighed, substantially as set forth.

In testimony that I claim the foregoing as my own I have hereto affixed my signature in the presence of two witnesses.

VIRGIL RATCLIFF.

Witnesses:
FRED L. TREES,
CHAS. W. TREES.